(12) United States Patent
Owens et al.

(10) Patent No.: US 7,763,578 B2
(45) Date of Patent: Jul. 27, 2010

(54) PREPARATION OF POLYMERIC FOAMS USING HYDROFLUOROETHER NUCLEATING AGENTS

(75) Inventors: John G. Owens, Woodbury, MN (US); Rudolf J. Dams, Antwerp (BE)

(73) Assignee: 3M Innovative Properties Company, St. Paul, MN (US)

(*) Notice: Subject to any disclaimer, the term of this patent is extended or adjusted under 35 U.S.C. 154(b) by 649 days.

(21) Appl. No.: 11/268,908

(22) Filed: Nov. 8, 2005

(65) Prior Publication Data

US 2006/0128821 A1 Jun. 15, 2006

Related U.S. Application Data

(60) Provisional application No. 60/625,893, filed on Nov. 8, 2004.

(51) Int. Cl.
*C08J 9/00* (2006.01)
*C11D 3/44* (2006.01)

(52) U.S. Cl. .................. 510/405; 510/408; 510/411; 510/412; 521/88; 521/89; 521/114

(58) Field of Classification Search ............ 521/88, 521/89, 114, 131; 510/405, 408, 411, 142
See application file for complete search history.

(56) References Cited

U.S. PATENT DOCUMENTS

| | | | |
|---|---|---|---|
| 4,205,138 A | 5/1980 | Muller et al. | |
| 4,221,876 A | 9/1980 | Wagner | |
| 4,247,653 A | 1/1981 | Wagner | |
| 4,326,086 A | 4/1982 | Mohring et al. | |
| 4,341,909 A | 7/1982 | Schneider et al. | |
| 4,972,002 A | 11/1990 | Volkert | |
| 5,137,932 A | 8/1992 | Behme et al. | |
| 5,264,462 A | 11/1993 | Hodson et al. | |
| 5,290,823 A | 3/1994 | Volkert | |
| 5,814,595 A * | 9/1998 | Flynn et al. | 510/411 |
| 5,925,611 A | 7/1999 | Flynn et al. | |
| 6,204,299 B1 | 3/2001 | Moore et al. | |
| 6,291,417 B1 | 9/2001 | Flynn et al. | |
| 6,472,444 B1 * | 10/2002 | Harris et al. | 521/88 |
| 6,953,082 B2 | 10/2005 | Costello et al. | |
| 2002/0061935 A1 | 5/2002 | Harris et al. | |
| 2002/0198273 A1 | 12/2002 | Nyberg et al. | |
| 2005/0127322 A1 | 6/2005 | Costello et al. | |

FOREIGN PATENT DOCUMENTS

| | | |
|---|---|---|
| CA | 1088523 | 10/1980 |
| DE | 2638759 | 3/1978 |
| DE | 2706297 | 8/1978 |
| EP | 0579321 | 9/1997 |
| EP | 1 445 276 | 8/2004 |
| WO | WO 00/24814 | 5/2000 |
| WO | WO 00/24815 | 5/2000 |

OTHER PUBLICATIONS

"Cellular Materials," Encyclopedia of Polymer Science and Engineering, vol. 3, pp. 1-59, (2d ed. John Wiley & Sons, 1985).
Encyclopedia of Polymer Science and Engineering, vol. 2, p. 437.
Encyclopedia of Polymer Science and Engineering, vol. 2, p. 434, supra.
High Polymers, vol. 16, "Polyurethanes," Parts I and II by J. H. Saunders and K. C. Frisch (Interscience Publishers, New York 1962 and 1964).
Plastics Handbook, vol. VII, "Polyurethanes," 1st ed. 1966, published by R. Vieweg and A. Hochtlen and 2d ed. 1983, published by G. Oertel (Carl Hanser Verlag, Munich).
"Integral Foams," published by H. Piechota and H. Rohr (Carl Hanser Verlag, Munich, 1966).
*Handbook of Polymeric Foams and Foam Technology*, Daniel Klempner and Kurt C. Frisch, ed., (Oxford University Press, 1991).
J. H. Saunders and K. C. Frisch in High Polymers, vol. XVI, "Polyurethanes," Part I, pp. 32-54 and 65-88, Interscience, New York (1962).
"Thermal Insulation," Encyclopedia of Chemical Technology, vol. 14, pp. 648-662 (4th ed., John Wiley & Sons, 1995).
*Handbook of Polymeric Foams and Foam Technology*, Daniel Klempner and Kurt C. Frisch, ed., (Oxford University Press, 1991), p. 407.
3M Company "Product Information Sheet: Novec 7500 Engineered Fluid"[Online] Aug. 2005, retrieved from the internet: URL:http://multimedia.mmm.com/mws/mediaweb server.dyn?VVVVVVDBN23V5yWVhyWVVVA7Efr7777t-> [retrieved on Mar. 7, 2006] the whole document.
3M Company "Product Information Sheet: Novec 7100 Engineered Fluid"[Online] Aug. 2005, retrieved from the internet: URL:http://multimedia.mmm.com/mws/mediaweb server.dyn?NNNNNNwuFZaNgqON9qONNNGHryJmmm1-> [retrieved on Mar. 7, 2006] the whole document.
3M Company Product Information Sheet: Novec Engineered Fluid HFE-7200 [Online] Sep. 2000, retrieved from the internet: URL:http://multimedia.mmm.com/mws/mediaweb server.dyn?XXXXXXF15hkXq_8XJ_8XXXGHNHTwwwwV-> [retrieved on Mar. 7, 2006] the whole document.
3M Company "Product Information Sheet: Novec Fluorosurfactant FC-4430"[Online] Oct. 2005, retrieved from the internet: URL:http://multimedia.mmm.com/mws/mediaweb server.dyn?222222PNZ6729Jg2tJg222qrvrCffffE-> [retrieved on Mar. 7, 2006] the whole document.

* cited by examiner

*Primary Examiner*—Irina S Zemel
(74) *Attorney, Agent, or Firm*—Kent S. Kokko

(57) ABSTRACT

Use of high boiling hydrofluoroethers as nucleating agents in the production of a polymeric foam, in particular in the production of polyurethane foams and phenolic foams. Also, blowing agent compositions and foamable compositions comprising one or more high boiling hydrofluoroether nucleating agents and foams made using such blowing agent compositions and foamable compositions.

5 Claims, No Drawings

PREPARATION OF POLYMERIC FOAMS USING HYDROFLUOROETHER NUCLEATING AGENTS

CROSS REFERENCE TO RELATED APPLICATION

This application claims the benefit of U.S. Provisional Application No. 60/625,893, filed Nov. 8, 2004.

FIELD

The present invention relates to the use of high boiling hydrofluoroethers as nucleating agents in the production of a polymeric foam and in particular in the production of polyurethane foams and phenolic foams. The invention further relates to a blowing agent composition and a foamable composition comprising one or more high boiling hydrofluoroether nucleating agents.

BACKGROUND

According to "Cellular Materials," Encyclopedia of Polymer Science and Engineering, vol. 3, pages 1-59, (2d ed. John Wiley & Sons, 1985), foamed plastic is defined as a plastic in which the apparent density decreases substantially with the presence of numerous cells disposed through its mass. The gas phase in a foamed plastic is generally distributed in cells which are preferably very fine to provide good thermal insulation Blowing agents produce gas used to generate cells in foamable polymeric materials, for example, to make foamed insulation. Physical blowing agents form cells by a phase change, for example, a liquid may be volatilized or a gas dissolved in a polymer under high pressure. Low boiling (e.g., typically less than 80° C., more typically less than about 50° C.) liquids, particularly chlorofluorocarbons (CFCs) and hydrochlorofluorocarbons (HCFCs), have been used throughout the world on a large scale to produce foamed plastics. However, CFCs and HCFCs are linked to the destruction of the earth's protective ozone layer. See Encyclopedia, vol. 2, page 437.

Commercially important liquid blowing agents include aliphatic and cycloaliphatic hydrocarbons and their chloro- and fluoro-derivatives. For example, isomers of pentane, hexane, and heptane are used mainly in the production of very low density polystyrene foam. These liquids tend to be inexpensive and low in toxicity but they are highly flammable. See Encyclopedia, vol. 2, page 434, supra.

Production of cellular plastic products, such as cellular polyurethane elastomers and flexible, semi-rigid or rigid polyurethane foams in the presence of catalysts, blowing agents, processing aids or additives is described in numerous patents and publications in the literature.

A survey of methods of producing cellular polyurethane elastomers, polyurethane foams and polyisocyanurate foams, their mechanical properties and their use can be found, for example, High Polymers, Vol. 14, "Polyurethanes," Parts I and II by J. H. Saunders and K. C. Frisch (Interscience Publishers, New York 1962 and 1964), Plastics Handbook, Volume VII, "Polyurethanes," 1st ed. 1966, published by R. Vieweg and A. Hochtlen and 2d ed. 1983, published by G. Oertel (Carl Hanser Verlag, Munich), and "Integral Foams," published by H. Piechota and H. Rohr (Carl Hanser Verlag, Munich, 1975).

Essentially two types of blowing agents are used to produce cellular polyurethanes: (1) low boiling inert liquids that evaporate under the influence of the exothermic polymerization process, for example, alkanes, such as butane, n-pentane or cyclopentane, halogenated hydrocarbons or halogenated fluorocarbons, such as methylene chloride, dichloromonofluoromethane, and trichlorofluoromethane; and (2) chemical compounds that form gaseous blowing agents by means of a chemical reaction or thermal decomposition, such as isocyanate groups reacted with water to produce carbon dioxide.

The *Handbook of Polymeric Foams and Foam Technology*, Daniel Klempner and Kurt C. Frisch, ed., (Oxford University Press, 1991), discloses that formation of uniform, fine cellular structure can be obtained by using nucleazites, also referred to as nucleating agents. The Handbook classifies nucleazites into three categories based on their mode of action as follows: (1) gaseous and liquid compounds that produce a supersaturated gas in the foamable composition and which form fine bubbles prior to action by a blowing agent (e.g., carbon dioxide, nitrogen, sodium bicarbonate, citric acid, and sodium citrate), (2) finely dispersed organic, inorganic, or metal powders that form so called "hot spots", and (3) finely dispersed compounds that provide nucleation centers at which the blowing agent converts to gaseous phase (e.g., talc, silicon dioxide, titanium dioxide, diatomaceous earth, kaolin, etc.).

After the phase out of chlorofluorocarbon ("CFC") production, many polymeric foams are produced using HCFC-141b ($CCl_2FCH_3$) as the blowing agent. With the impending phase out of this blowing agent many producers are looking to use hydrocarbons such as cyclopentane as blowing agents. While foam manufacturers are discovering that they can safely handle the relatively high flammability of these blowing agents, the resultant foams exhibit relatively higher thermal conductivity, a significant drawback to these blowing agents. Foams produced with nonhalogenated blowing agents such as cyclopentane or $CO_2$ (produced in situ via the reaction of water with the isocyanate) typically exhibit thermal conductivities which are 10 to 15 percent higher than those produced with CFCs, HCFCs such as HFC-245fa ($CF_3CH_2CHF_2$).

Whereas the blowing agent provides the essential volume to form the voids in the foamable resin that become the resultant cells in the finished foam, the nucleating agents provide the initiating sites at which the blowing agent forms the voids. By selection of nucleating agent, one can obtain a foam with fewer relatively larger voids, or a foam with a greater number of relatively smaller voids.

It has been reported that low concentrations of perfluorinated compounds such as $C_5F_{12}$, $C_6F_{14}$, and $C_5F_{11}NO$ could be used as a nucleating agent to cause generation of smaller cell sizes in foams. As a result, such foams exhibited lower thermal conductivity. However, due to the long atmospheric lifetimes and high global warming potentials of perfluorinated compounds, their use as nucleating agents is inhibited.

Unsaturated perfluorinated compounds such as HFP dimer [$(CF_3)_2CFCF=CFCF_3$)] also showed promise as a nucleating agent and offered somewhat better environmental properties as compared to perfluorinated compounds but they have not been commercially adopted for foam blowing applications.

Another alternative is to use partially fluorinated compounds that have been introduced as replacements for CFCs, HCFCs, and PFCs in other applications. Replacement materials such as 3M NOVEC Brand HFE-7100 and HFE-7200 have desirable environmental and toxicological properties but failed to provide acceptable performance as nucleating agents in foams.

The need exists for nucleating agents that exhibit desirable environmental and toxicological properties and function as acceptable nucleating agents and yield higher performing polymeric foams.

SUMMARY

The invention provides a foamable composition for preparing polymeric foam, a process for preparing polymeric foam, a blowing agent composition for preparing polymeric foam, and foams made therewith.

In brief summary, the foamable composition of the invention comprises at least one blowing agent, at least one foamable polymer or a precursor composition thereof and at least one nucleating agent as described herein.

In brief summary, the process of the invention comprises a process for preparing polymeric foam comprising the step of vaporizing at least one liquid or gaseous blowing agent or generating at least one gaseous blowing agent in the presence of at least one foamable polymer or a precursor composition thereof and at least one nucleating agent as described herein In brief summary, the blowing agent composition of the invention comprises at least one blowing agent and at least one nucleating agent as described herein.

In accordance with the present invention, the nucleating agents are segregated ethers having the general structure:

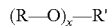

wherein:
x is 1 or 2;
O is oxygen;
one of R and R' is a perfluoroaliphatic or perfluorocyclic group and the other is an aliphatic or cyclic group. When x is 2 each R may comprise the same or a different number of carbon atoms. When R or R' is a perfluoroaliphatic or perfluorocyclic group it may optionally contain one or more in chain heteroatoms such as O, N, or S atoms. The compound has a boiling point at 1 atmosphere of at least about 80° C. and a percent fluorine saturation of more than 66 and less than 85.

In addition to providing useful performance as nucleating agents, the segregated ethers useful herein can offer additional important benefits in safety of use and in environmental compatibility (e.g., zero ozone depletion potential and low atmospheric lifetime). For example, 3M NOVEC Brand HFE-7500 has low acute toxicity (its acute lethal concentration is greater than 10,000 ppm which is its saturated concentration in air at room temperature). The segregated ethers useful herein are non-ozone depleting and as a result of their rapid degradation in the lower atmosphere, have short atmospheric lifetimes, and would not be expected to contribute significantly to global warming. Further, polymeric foams produced in accordance with the invention have excellent thermal insulation properties.

DETAILED DESCRIPTION OF ILLUSTRATIVE EMBODIMENTS

Nucleating Agent

As discussed above, the nucleating agents are segregated ethers having the general structure:

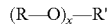

wherein:
x is 1 or 2;
O is oxygen;
one of R and R' is a perfluoroaliphatic or perfluorocyclic group and the other is an aliphatic or cyclic group. When x is 2 each R may comprise the same or a different number of carbon atoms. When R or R' is a perfluoroaliphatic or perfluorocyclic group it may optionally contain one or more in chain heteroatoms such as O, N, or S atoms. The compound has a boiling point at 1 atmosphere of at least about 80° C. and a percent fluorine saturation of more than 66 and less than 85. The percent fluorine saturation is the number of sites occupied by fluorine divided by the total number of sites available on the carbon backbone multiplied by 100.

Representative examples of hydrofluoroethers suitable for use in the processes and composition of the invention include the following compounds: $C_5F_{11}OC_2H_5$, $C_3F_7OCF(CF_3)CF_2OCH_3$, $C_4F_9OC_2F_4OC_2F_4OC_2H_5$, $C_4F_9O(CF_2)_3OCH_3$, $C_3F_7CF(OC_2H_5)CF(CF_3)_2$, $C_2F_5CF(OCH_3)CF(CF_3)_2$, $C_4F_9OC_2H_4OC_4F_9$,

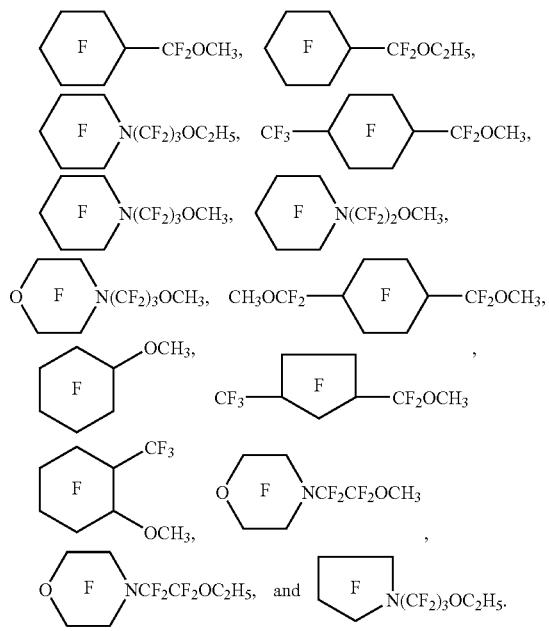

These materials have rather limited solubility in the foamable resin or foam precursors described below, and while we do not wish to be bound by this theory, it is believed that the nucleating agents described above when finely dispersed throughout the resin (or precursor) provide nucleation centers at which the blowing agent(s) converts to gaseous phase thereby foaming the resin.

Blowing Agent

Nucleating agents of the invention can be used with a variety of blowing agents including liquid or gaseous blowing agents that are vaporized in order to foam the polymer or gaseous blowing agents that are generated in situ in order to foam the polymer.

Illustrative examples of blowing agents include chlorofluorocarbons (CFCs), hydrochlorofluorocarbons (HCFCs), hydrofluorocarbons (HFCs), hydrochlorocarbons (HCCs), iodofluorocarbons (IFCs), hydrocarbons, and hydrofluoroethers that do not meet the criteria for nucleating agents described above. The blowing agent for use in this invention should have a boiling point of from about −45° C. to about 100° C. at atmospheric pressure. Preferably at atmospheric pressure the blowing agent has a boiling point of at least about 15° C., more preferably between about 20° C. and about 80° C., and most preferably between about 30° C. and about 65° C.

Illustrative examples of blowing agents that can be used in the invention include aliphatic and cycloaliphatic hydrocarbons having about 5 to about 7 carbon atoms, such as n-pentane and cyclopentane, CFCs such as $CFCl_3$ (CFC-11) and $CCl_2FCClF_2$ (CFC-113), HFCs such as $CF_3CF_2CHFCHFCF_3$, $CF_3CH_2CF_2H$, $CF_3CH_2CF_2CH_3$, $CF_3CF_2H$, $CH_3CF_2H$ (HFC-152a), $CF_3CH_2CH_2CF_3$ and $CHF_2CF_2CH_2F$, HCFCs such as $CH_3CCl_2F$, $CF_3CHCl_2$, and $CF_2HCl$, HCCs such as 2-chloropropane, and IFCs such as $CF_3I$, and HFEs such as $C_4F_9OCH_3$. In certain formulations $CO_2$ generated from the reaction of water with foam precursor such as an isocyanate can be used as a blowing agent.

Blowing Agent Composition

Blowing agent compositions of the invention comprise one or more nucleating agents as described above and one or more blowing agents as discussed above. The molar ratio of nucleating agent to blowing agent is typically about 1:9. Higher proportions of nucleating agent may be used in some embodiments (e.g., a molar ratio of about 1:7), but will typically be more expensive. In some embodiments, lesser proportions of nucleating agent (e.g., 1:25 or even 1:50) may be used.

Resin

Foamable polymers suitable for use in the foamable compositions of the invention include polyolefins, e.g., polystyrene, poly(vinyl chloride), and polyethylene. Foams can be prepared from styrene polymers using conventional extrusion methods. The blowing agent composition can be injected into a heat-plastified styrene polymer stream within an extruder and admixed therewith prior to extrusion to form foam. Representative examples of suitable styrene polymers include the solid homopolymers of styrene, α-methylstyrene, ring-alkylated styrenes, and ring-halogenated styrenes, as well as copolymers of these monomers with minor amounts of other readily copolymerizable olefinic monomers, e.g., methyl methacrylate, acrylonitrile, maleic anhydride, citraconic anhydride, itaconic anhydride, acrylic acid, N-vinylcarbazole, butadiene, and divinylbenzene. Suitable vinyl chloride polymers include vinyl chloride homopolymer and copolymers of vinyl chloride with other vinyl monomers. Ethylene homopolymers and copolymers of ethylene with, e.g., 2-butene, acrylic acid, propylene, or butadiene are also useful. Mixtures of different types of polymers can be employed.

Precursors of foamable polymers suitable for use in the foamable compositions of the invention include precursors of phenolic polymers, silicone polymers, and isocyanate-based polymers, e.g., polyurethane, polyisocyanurate, polyurea, polycarbodiimide, and polyimide. Precursors of isocyanate-based polymers are preferred, as the blowing agent compositions of the invention are especially useful for preparing polyurethane or polyisocyanurate foams.

Polyisocyanates suitable for use in the preferred compositions of the invention include aliphatic, alicyclic, arylaliphatic, aromatic, or heterocyclic polyisocyanates, or combinations thereof. Any polyisocyanate which is suitable for use in the production of polymeric foams can be utilized. Of particular importance are aromatic diisocyanates such as toluene and diphenylmethane diisocyanates in pure, modified, or crude form. MDI variants (diphenylmethane diisocyanate modified by the introduction of urethane, allophanate, urea, biuret, carbodiimide, uretonimine, or isocyanurate residues) and the mixtures of diphenylmethane diisocyanates and oligomers thereof known in the art as crude or polymeric MDI (polymethylene polyphenylene polyisocyanates) are especially useful.

Representative examples of suitable polyisocyanates include ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate (and mixtures of these isomers), diisocyanato-3,3,5-trimethyl-5-isocyanatomethyl cyclohexane, 2,4 - and 2,6-toluene diisocyanate (and mixtures of these isomers), diphenylmethane-2,4'- and/or -4,4'-diisocyanate, naphthalene-1,5-diisocyanate, the reaction products of four equivalents of the aforementioned isocyanate-containing compounds with compounds containing two isocyanate-reactive groups, triphenyl methane-4,4',4"-triisocyanate, polymethylenepolyphenylene polyisocyanates, m- and p-isocyanatophenyl sulfonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization reactions, polyisocyanates containing ester groups, reaction products of the above-mentioned diisocyanates with acetals, polyisocyanates containing polymeric fatty acid esters, and mixtures thereof. Distillation residues (obtained in the commercial production of isocyanates) having isocyanate groups can also be used alone or in solution in one or more of the above-mentioned polyisocyanates.

Reactive hydrogen-containing compounds suitable for use in the preferred foamable compositions of the invention are those having at least two isocyanate-reactive hydrogen atoms, preferably in the form of hydroxyl, primary or secondary amine, carboxylic acid, or thiol groups, or a combination thereof. Polyols, i.e., compounds having at least two hydroxyl groups per molecule, are especially preferred due to their desirable reactivity with polyisocyanates. Such polyols can be, e.g., polyesters, polyethers, polythioethers, polyacetals, polycarbonates, polymethacrylates, polyester amides, or hydroxyl-containing prepolymers of these compounds and a less than stoichiometric amount of polyisocyanate.

Representative examples of suitable reactive hydrogen-containing compounds have been described, e.g., by J. H. Saunders and K. C. Frisch in High Polymers, Volume XVI, "Polyurethanes," Part I, pages 32-54 and 65-88, Interscience, New York (1962). Mixtures of such compounds are also useful, and, in some cases, it is particularly advantageous to combine low-melting and high-melting polyhydroxyl-containing compounds with one another, as described in DE 2,706,297 (Bayer A G). Useful polyols include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis(hydroxymethyl)cyclohexane, 2-methyl-1,3-propane diol, dibromobutene diol, glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxydiphenyl propane, and dihydroxymethyl hydroquinone. Other suitable polyols include the condensation products of polybasic acids and polyols such as polyethylene adipate and polycaprolactone-based polyols, as well as the mixtures of hydroxy aldehydes and hydroxy ketones ("formose") and the polyhydric alcohols obtained therefrom by reduction ("formitol") that are formed in the autocondensation of formaldehyde hydrate in the presence of metal compounds as catalysts and compounds capable of enediol formation as co-catalysts (see, e.g., U.S. Pat. No. 4,341,909 (Schneider et al.), U.S. Pat. No. 4,247,653 (Wagner), U.S. Pat. No. 4,221,876 (Wagner), U.S. Pat. No. 4,326,086 (Mohring et al.), and U.S. Pat. No. 4,205,138 (Muller et al.), as well as CA 1,088,523 (Bayer A G)). Solutions of polyisocyanate polyaddition products, particularly solutions of polyurethane ureas containing ionic groups and/or solutions of polyhydrazodicarbonamides, in low molecular weight polyhydric alcohols can also be used (see DE 2,638,759).

Many other compounds containing isocyanate-reactive hydrogen atoms are useful in the preferred foamable compositions of the invention, as will be apparent to those skilled in the art of polyurethane science and technology.

Phenolic polymer precursors suitable for use in the compositions of this invention include the reaction product of a phenol and an aldehyde in the presence of a catalyst. Illustrative uses of phenolic foams of this invention include use for roofing insulation, as sheathing products for external wall insulation for building applications, and for shaped parts such as pipe and block insulation for industrial applications, as described in "Thermal Insulation," Encyclopedia of Chemical Technology, vol. 14, pages 648-662 (4th ed., John Wiley & Sons, 1995).

Preferred polymeric foams can be prepared using the preferred foamable compositions of the invention by vaporizing (e.g., by utilizing the heat of precursor reaction) at least one blowing agent in the presence of a nucleating agent as described above, at least one organic polyisocyanate and at least one compound containing at least two reactive hydrogen atoms. In making a polyisocyanate-based foam, the polyisocyanate, reactive hydrogen-containing compound, and blowing agent composition can generally be combined, thoroughly mixed (using, e.g., any of the various known types of mixing head and spray apparatus), and permitted to expand and cure into a cellular polymer. It is often convenient, but not necessary, to preblend certain of the components of the foamable composition prior to reaction of the polyisocyanate and the reactive hydrogen-containing compound. For example, it is often useful to first blend the reactive hydrogen-containing compound, blowing agent composition, and any other components (e.g., surfactant) except the polyisocyanate, and to then combine the resulting mixture with the polyisocyanate. Alternatively, all components of the foamable composition can be introduced separately. It is also possible to pre-react all or a portion of the reactive hydrogen-containing compound with the polyisocyanate to form a prepolymer.

Other Components

Other conventional components of foam formulations can optionally be present in the foamable compositions of the invention. For example, cross-linking or chain-extending agents, foam-stabilizing agents or surfactants, catalysts and fire-retardants can be utilized. Other possible components include fillers (e.g., carbon black), colorants, fungicides, bactericides, antioxidants, reinforcing agents, antistatic agents, and other additives or processing aids known to those skilled in the art.

Preferably, the foamable compositions of the invention include at least one surfactant. Suitable surfactants include fluorochemical surfactants, organosilicone surfactants, polyethylene glycol ethers of long chain alcohols, tertiary amine or alkanolamine salts of long chain alkyl acid sulfate esters, alkyl sulfonate esters, alkyl arylsulfonic acids, fatty acid alkoxylates, and mixtures thereof. Surfactant is generally employed in amounts sufficient to stabilize the foaming reaction mixture against collapse and the formation of large, uneven cells. Typically, from about 0.1 to about 5 percent by weight of surfactant is sufficient for this purpose. Organosilicone surfactants and fluorochemical surfactants are preferred. In addition, the surfactant can help to disperse or emulsify the nucleating agent into the foamable composition.

The preferred foamable composition preferably also contains a catalyst. Catalysts suitable for use in the preferred foamable compositions of the invention include compounds which greatly accelerate the reaction of the reactive hydrogen-containing compounds (or the cross-linking or chain-extending agents) with the polyisocyanates. When used, catalysts are generally present in amounts sufficient to be catalytically effective. Suitable catalysts include organic metal compounds (preferably, organic tin compounds), which can be used alone or, preferably, in combination with amines. Representative examples of these and other types of suitable catalysts are described in U.S. Pat. No. 4,972,002 (Volkert).

Foams

Foams prepared from the foamable compositions of the invention can vary in texture from very soft types useful in upholstery applications to rigid foams useful as structural or insulating materials. The foams can be used, for example, in the automobile, shipbuilding, aircraft, furniture, and athletic equipment industries, and are especially useful as insulation materials in the construction and refrigeration industries.

One of the advantages of the present invention is that use of nucleating agents as described herein can permit reduction in emissions of global warming materials in the manufacture and subsequent use of polymeric foams that may qualify for pollution emission credits. Additionally, the present invention can be used to make more thermally efficient foams that can be used to manufacture more energy efficient products which may qualify for pollution emission reduction credits.

The following examples are intended to further illustrate the invention without however the intention to limit the invention thereto. In the examples, all percentage and parts are by weight unless indicated otherwise.

EXAMPLES

Example 1 and Comparative Example C-1

In the following examples and comparative examples, the thermal conductivity (lambda) values of the foams were measured on a 200×200×25 cm test sample, perpendicular to the foam rise direction. The thermal conductivity was measured at a temperature of 23° C. initially and after heat aging at 50° C. for 2 weeks using a Hesto Lambda Control A-50 thermal conductivity analyzer with a reproducibility of ±0.1 (milliWatt/meter*Kelvin).

The range of cell sized diameters described in the examples and the comparative examples were designated as follows:

| | |
|---|---|
| Very Fine | 70–100 micrometers |
| Fine | 100–150 micrometers |
| Medium | 150–200 micrometers |
| Large | 200–300 micrometers |
| Very Large | >300 micrometers |

Abbreviations

The following abbreviations and trade names were used in the examples:

| | |
|---|---|
| g | Grams |
| cm | Centimeters |
| rpm | revolutions per minute |
| Ex. | Example |
| DESMODUR ™ 44V-20 | polymeric diisocyanate having an isocyanate content of 31.5% by weight and a viscosity of 200 ± 40 cps at 25° C., commercially available from Bayer AG. |

-continued

| | |
|---|---|
| Polyol 1751 A/2 | polyether polyol having a hydroxyl equivalent weight of 425 mg KOH/g, water content of 4.6 parts by weight, catalyst content of 3.7 parts by weight N,N-dimethylcyclohexylamine, and a viscosity of about 820 cps at 25° C., commercially available from Bayer AG under the trade name BAYTHERM ™ VP-PU 1751 A/2 |
| Polyol 1832 A/2 | polyether polyol having a hydroxyl equivalent weight of 520 mg KOH/g, a water content of 1.9 parts, a catalyst content of 3.7 parts N,N-dimethylcyclohexylamine and a viscosity of about 4000 cps at 25° C., commercially available from Bayer AG under the tradename BAYTHERM ™ VP-PU 1832 A/2. |
| ADOGEN 464 ™ | Available from Aldrich |
| Silicone surfactant B-8423 | Available from T. H. Goldschmidt. |
| NOVEC ™ Fluorosurfactant FC-4430 | Available from 3M Company |
| NOVEC ™ Engineered Fluid HFE 7500 | $C_3F_7CF(OC_2H_5)CF(CF_3)_2$ Available from 3M Company |
| NOVEC ™ Engineered Fluid HFE 7200 | $C_4F_9OC_2H_5$ Available from 3M Company |
| Cyclopentane | Available from Aldrich. |

Preparation of $C_4F_9OC_3H_7$

Potassium fluoride (32 g, 0.55mole), dipropyl sulfate (99.2 g, 0.55 mole), diglyme (108 g) and ADOGEN 464™ (7.0 g) were placed in a 600 ml Parr reaction vessel under nitrogen and the reactor was sealed. After cooling the reactor in dry ice, $C_3F_7COF$ (108 g of 65% purity, 0.5 mole) was condensed into the reaction mixture. The temperature was gradually raised to 60° C. and held at this temperature for about 20 hours. After cooling to room temperature the reactor was opened and the reaction mixture transferred to a reaction flask and water added (about 300 ml). This mixture was azeotropically distilled and the resulting lower fluorochemical phase separated and washed with water containing a little sodium chloride to enhance phase separation. This material contained about 6% of $C_4F_9CO_2C_3H_6$ and was subsequently treated with 50% aqueous potassium hydroxide (50 g) by heating to reflux for four hours. A subsequent azeotropic distillation afforded the crude ether which was then fractionally distilled (boiling point=92.5 to 94° C.) purity of 97.8% as determined by gas-liquid chromotography. The structure was confirmed by gas chromatography/mass spectrometry (GCMS) and by $^1H$ and $^{19}F$ NMR.

Preparation of $c\text{-}C_6F_{11}CF_2OCH_3$ $c\text{-}C_6F_{11}CF_2OCH_3$ was prepared according to methods described in U.S. Pat. No. 6,291,417. The material identity used in the following examples was confirmed by gas chromatography/mass spectrometry (GCMS) and by $^1H$ and $^{19}F$ NMR.

Preparation of $C_2F_5CF(OCH_3)CF(CF_3)_2$ 1,1,1,2,2,3,4,5,5,5-decafluoro-3-methoxy-4-trifluoromethyl-pentane ($C_2F_5CF(OCH_3)CF(CF_3)_2$) was prepared according to methods described in U.S. Pat. No. 5,925,611. The material used in the following example was 99.96% pure as determined by NMR analysis.

Example 1

Polyurethane Foam Prepared Using Water as a Blowing Agent

NOVEC™ Engineered Fluid HFE 7500 (3.5 grams) was emulsified in polyol 1751 A/2 (118 g) and silicone surfactant B-8423 (3.5 g) using a high shear mixer at 6000 rpm. DESMODUR™ 44V-20 (225 g) was then added to this emulsion while mixing at 6000 rpm for 15 seconds. The resulting mixture was poured into a 350 cm×350 cm×60 cm aluminum mold that was preheated to 50° C.

Comparative Example C1

Water Blown Polyurethane Foam Prepared Without a Nucleating Agent

Comparative Example C1 was prepared essentially according to the procedure described in Example 1 but without the NOVEC™ HFE 7500 nucleating agent. Analysis of the foams prepared in Example 1 and Example C1 are shown in Table 1 below. Thermal conductivity was measured after initially preparing the foams and after aging the foams for 2 weeks at 50° C. The percent reduction of the thermal conductivity, after aging, relative to the foam prepared without nucleating agent (Ex. C1) was also determined.

TABLE 1

Water Blown Polyurethane Foams

| | Ex. 1 | Ex. C1 |
|---|---|---|
| Foam Density (kg/m³) | 38.6 | 39.9 |
| Initial Thermal Conductivity (mW/mK) | 23.5 | 26.7 |
| Aged Thermal Conductivity (mW/mK) | 32.1 | 35.7 |
| % Thermal Conductivity Reduction (aged) | 10.1% | — |
| Average Foam Cell Size | Large | Very Large |

Examples 2 - 6 and Comparative Examples C2 - C4

Polyurethane Foam Prepared Using Cyclopentane Blowing Agent

Examples 2 to 6 and Comparative Examples C2 to C4 were prepared essentially according to the procedure described in Example 1 using the mixtures outlined in Table 2 below. Analyses of the foams prepared in Examples 2 to 6 and Comparative Examples C2 to C4 are shown in Table 2 below. Thermal conductivity was measured after initially preparing the foams and after aging the foams for 2 weeks at 50° C. The percent reduction of the thermal conductivity, after aging, relative to the foam prepared without nucleating agent (Ex. C2) was also determined.

TABLE 2

|  | Ex. 2 | Ex. 3 | Ex. 4 | Ex. 5 | Ex. 6 | Ex. C2 | Ex. C3 | Ex. C4 |
|---|---|---|---|---|---|---|---|---|
| Polyol 1832 A/2 | 122.0 | 122.0 | 122.0 | 122.0 | 122.0 | 122.0 | 122.0 | 122.0 |
| DESMODUR ™ 44V-20 | 199.0 | 199.0 | 199.0 | 199.0 | 199.0 | 199.0 | 199.0 | 199.0 |
| Cyclopentane (g) | 15.0 | 15.0 | 15.0 | 15.0 | 15.0 | 15.0 | 15.0 | 15.0 |
| Silicone Surfactant B-8423 | 3.5 | 3.5 | 3.5 | 3.5 | — | 3.5 | 3.5 | 3.5 |
| NOVEC ™ FC-4430 | — | — | — | — | 3.5 | — | — | — |
| NOVEC ™ HFE 7500 | 3.5 | 7.0 | — | — | 3.5 | — | — | — |
| $c\text{-}C_6F_{11}CF_2OCH_3$ | — | — | 3.5 | — | — | — | — | — |
| $C_2F_5CF(OCH_3)CF(CF_3)_2$ | — | — | — | 3.5 | — | — | — | — |
| $C_4F_9OC_3H_7$ | — | — | — | — | — | — | 3.5 | — |
| NOVEC ™ HFE 7200 | — | — | — | — | — | — | — | 3.5 |
| Density (kg/m$^3$) | 24.7 | 25.6 | 25.7 | 24.9 | 25.6 | 24.8 | 26.2 | 25.8 |
| Initial Thermal Conductivity (mW/mK) | 20.5 | 20.3 | 20.1 | 20.3 | 20.0 | 21.8 | 21.6 | 21.4 |
| Aged Thermal Conductivity (mW/mK) | 21.8 | 21.6 | 22.0 | 21.8 | 21.7 | 21.8 | 23.9 | 24.5 |
| % Thermal Conductivity Reduction (aged) | 13.8% | 14.6% | 13.0% | 13.8% | 14.2% | 0.0% | 5.5% | 3.2% |
| Average Foam Cell Size | Fine | Fine | Fine | Fine | Fine | Medium | Medium | Medium |

What is claimed is:

1. A blowing agent composition consisting of (i) a blowing agent selected from the group consisting of aliphatic hydrocarbons having 5 to 7 carbon atoms, cycloaliphatic hydrocarbons having 5 to 7 carbon atoms, and water, and (ii) a nucleating agent wherein said nucleating agent is a segregated hydrofluoroether having a boiling point at 1 atmosphere of at least 80° C. and a percent fluorine saturation of more than 66 and less than 85.

2. The blowing agent composition of claim 1 wherein said nucleating agent and said blowing agent are in a molar ratio of less than 1:9.

3. The blowing agent composition of claim 1 wherein said segregated ether has the general structure:

$$(R\text{—}O)_x\text{—}R'$$

wherein:

x is 1 or 2; O is oxygen; and one of R and R' is a perfluoroaliphatic or perfluorocyclic group and the other is an aliphatic or a cyclic group.

4. The blowing agent composition of claim 1 wherein the blowing agent is selected from the group consisting of aliphatic hydrocarbons having 5 to 7 carbon atoms, cycloaliphatic hydrocarbons having 5 to 7 carbon atoms.

5. The blowing agent composition of claim 1 wherein the blowing agent is water.

* * * * *

UNITED STATES PATENT AND TRADEMARK OFFICE
CERTIFICATE OF CORRECTION

PATENT NO. : 7,763,578 B2  
APPLICATION NO. : 11/268908  
DATED : July 27, 2010  
INVENTOR(S) : John Glenn Owens Page 1 of 1

It is certified that error appears in the above-identified patent and that said Letters Patent is hereby corrected as shown below:

Column 1,  
Line 29, delete "insulation" and insert -- insulation. --.

Column 3,  
Line 16, delete "herein" and insert -- herein. --.

Column 4,  
Line 55, delete "hydrofluorethers" and insert -- hydrofluoroethers --.

Column 6,  
Line 6, delete "polymethylenepolyphenylene" and insert -- polymethylene polyphenylene --.

Line 46, delete "dibromobutene" and insert -- dibromobutane --.

Column 9,  
Line 52, delete "chromotography." and insert -- chromatography. --.

Signed and Sealed this

Twelfth Day of October, 2010

David J. Kappos  
*Director of the United States Patent and Trademark Office*